US008289299B2

(12) United States Patent
Newton

(10) Patent No.: US 8,289,299 B2
(45) Date of Patent: Oct. 16, 2012

(54) TOUCH SCREEN SIGNAL PROCESSING

(75) Inventor: John Newton, Auckland (NZ)

(73) Assignee: Next Holdings Limited (NZ)

( * ) Notice: Subject to any disclaimer, the term of this patent is extended or adjusted under 35 U.S.C. 154(b) by 418 days.

(21) Appl. No.: 12/580,409

(22) Filed: Oct. 16, 2009

(65) Prior Publication Data

US 2010/0097353 A1    Apr. 22, 2010

Related U.S. Application Data

(60) Division of application No. 11/033,183, filed on Jan. 11, 2005, now Pat. No. 7,629,967, which is a continuation of application No. PCT/NZ2004/000029, filed on Feb. 16, 2004.

(30) Foreign Application Priority Data

Feb. 14, 2003 (NZ) ........................................ 524211

(51) Int. Cl.
*G06F 3/042*    (2006.01)
(52) U.S. Cl. ..................................... 345/175; 178/18.09
(58) Field of Classification Search .......... 345/173–179; 178/18.01–18.09, 18.11, 20.01
See application file for complete search history.

(56) References Cited

U.S. PATENT DOCUMENTS

| | | | |
|---|---|---|---|
| 844,152 A | 2/1907 | Little | |
| 2,407,680 A | 9/1946 | Palmquist et al. | |
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |
| 3,478,220 A | 11/1969 | Milroy | |
| 3,563,771 A | 2/1971 | Tung | |
| 3,613,066 A | 10/1971 | Cooreman | |

(Continued)

FOREIGN PATENT DOCUMENTS

AU        7225001        1/2002
(Continued)

OTHER PUBLICATIONS

Anon, "SMART Board Specifications Model 680i", *XP7915047* Retrieved from the Internet: URL:http://www2.smarttech.com/kbdoc/74231 [retrieved on Sep. 23, 2010] the whole document, 2008, pp. 1-5. Benko, et al., "Precise Selection Techniques for Multi-Touch Screens", *Conference on Human Factors in Computing Systems—Proceedings 2006*, 2: 1263-1273.
Buxton, et al., "Issues and Techniques in Touch-Sensitive Tablet Input", *Computer Graphics, Proceedings of SIGGRAPH'85*, 1985, 19(3): 215-223.

(Continued)

*Primary Examiner* — Amare Mengistu
*Assistant Examiner* — Hong Zhou
(74) *Attorney, Agent, or Firm* — Kilpatrick Townsend & Stockton LLP

(57) ABSTRACT

A touch screen which uses light sources at one or more edges of the screen which directs light across the surface of the screen and at least two cameras having electronic outputs located at the periphery of the screen to receive light from said light sources. A processor receives the outputs of said cameras and employs triangulation techniques to determine the location of an object proximate to said screen. Detecting the presence of an object includes detecting at the cameras the presence or absence of direct light due to the object, using a screen surface as a mirror and detecting at the cameras the presence or absence of reflected light due to an object. The light sources may be modulated to provide a frequency band in the output of the cameras.

32 Claims, 10 Drawing Sheets

U.S. PATENT DOCUMENTS

| | | |
|---|---|---|
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,618 A | 1/1981 | Van Arnam |
| 4,243,879 A | 1/1981 | Carroll et al. |
| 4,247,767 A | 1/1981 | O'Brien et al. |
| 4,329,037 A | 5/1982 | Caviness |
| 4,420,261 A | 12/1983 | Barlow et al. |
| 4,459,476 A | 7/1984 | Weissmueller et al. |
| 4,468,694 A | 8/1984 | Edgar |
| 4,486,363 A | 12/1984 | Pricone et al. |
| 4,507,557 A | 3/1985 | Tsikos |
| 4,542,375 A | 9/1985 | Alles et al. |
| 4,550,250 A | 10/1985 | Mueller et al. |
| 4,553,842 A | 11/1985 | Griffin |
| 4,558,313 A | 12/1985 | Garwin et al. |
| 4,601,861 A | 7/1986 | Pricone et al. |
| 4,672,364 A | 6/1987 | Lucas |
| 4,673,918 A | 6/1987 | Adler et al. |
| 4,688,933 A | 8/1987 | Lapeyre |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A * | 1/1990 | Doering et al. ............ 341/31 |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,043,751 A | 8/1991 | Rice |
| 5,097,516 A | 3/1992 | Amir |
| 5,103,085 A | 4/1992 | Zimmerman |
| 5,103,249 A | 4/1992 | Keene |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,177,328 A | 1/1993 | Ito et al. |
| 5,179,369 A | 1/1993 | Person et al. |
| 5,196,835 A | 3/1993 | Blue et al. |
| 5,196,836 A | 3/1993 | Williams |
| 5,200,851 A | 4/1993 | Coderre et al. |
| 5,200,861 A | 4/1993 | Moskovich |
| 5,233,502 A | 8/1993 | Beatty et al. |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,541,372 A | 7/1996 | Baller et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,712,024 A | 1/1998 | Okuzaki et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,877,459 A | 3/1999 | Prater |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,936,770 A | 8/1999 | Nestegard et al. |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura et al. |
| 6,002,808 A | 12/1999 | Freeman |
| 6,008,798 A | 12/1999 | Mato, Jr. et al. |
| 6,015,214 A | 1/2000 | Heenan et al. |
| 6,020,878 A | 2/2000 | Robinson |
| 6,031,524 A | 2/2000 | Kunert |
| 6,031,531 A | 2/2000 | Kimble |
| 6,061,177 A | 5/2000 | Fujimoto |
| 6,067,080 A | 5/2000 | Holtzman |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |

| | | |
|---|---|---|
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,285,359 B1 | 9/2001 | Ogasawara et al. |
| 6,310,610 B1 | 10/2001 | Beaton et al. |
| 6,320,597 B1 | 11/2001 | Van Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,406,758 B1 | 6/2002 | Bottari et al. |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,501,461 B2 | 12/2002 | Holtzman |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,518,960 B2 | 2/2003 | Omura et al. |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,537,673 B2 | 3/2003 | Sada et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,664,952 B2 | 12/2003 | Iwamoto et al. |
| 6,670,985 B2 | 12/2003 | Karube et al. |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,727,885 B1 | 4/2004 | Ishino et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,741,267 B1 | 5/2004 | Van Leperen |
| 6,747,636 B2 | 6/2004 | Martin |
| 6,756,910 B2 | 6/2004 | Ohba et al. |
| 6,760,009 B2 * | 7/2004 | Omura et al. ............... 345/157 |
| 6,760,999 B2 | 7/2004 | Branc et al. |
| 6,767,102 B1 | 7/2004 | Heenan et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,909,425 B2 | 6/2005 | Matsuda et al. |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,029 B2 | 9/2005 | Katagiri et al. |
| 6,947,032 B2 | 9/2005 | Morrison et al. |
| 6,952,202 B2 | 10/2005 | Hirabayashi |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,113,174 B1 | 9/2006 | Takekawa et al. |
| 7,121,470 B2 | 10/2006 | McCall et al. |
| 7,133,032 B2 | 11/2006 | Cok |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,230,608 B2 | 6/2007 | Cok |
| 7,232,986 B2 | 6/2007 | Worthington et al. |
| 7,236,132 B1 | 6/2007 | Lin et al. |
| 7,236,154 B1 | 6/2007 | Kerr et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman et al. |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,432,914 B2 | 10/2008 | Kobayashi et al. |
| 7,460,110 B2 | 12/2008 | Ung et al. |
| 7,477,241 B2 | 1/2009 | Lieberman et al. |
| 7,479,949 B2 | 1/2009 | Jobs et al. |
| 7,492,357 B2 | 2/2009 | Morrison et al. |

| Patent No. | Date | Name |
|---|---|---|
| 7,499,037 B2 | 3/2009 | Lube |
| 7,515,138 B2 | 4/2009 | Sullivan |
| 7,515,141 B2 | 4/2009 | Kobayashi |
| 7,522,156 B2 | 4/2009 | Sano et al. |
| 7,538,759 B2 | 5/2009 | Newton |
| 7,557,935 B2 | 7/2009 | Baruch |
| 7,559,664 B1 | 7/2009 | Walleman et al. |
| 7,619,617 B2 | 11/2009 | Morrison et al. |
| 7,629,967 B2 | 12/2009 | Newton |
| 7,692,625 B2 | 4/2010 | Morrison et al. |
| 7,751,671 B1 | 7/2010 | Newton et al. |
| 7,755,613 B2 | 7/2010 | Morrison et al. |
| 7,777,732 B2 | 8/2010 | Herz et al. |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0034439 A1 | 2/2003 | Reime et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0218297 A1 | 10/2005 | Suda et al. |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 | 2/2006 | Keely et al. |
| 2006/0034486 A1 | 2/2006 | Morrison et al. |
| 2006/0070187 A1 | 4/2006 | Chilson |
| 2006/0132432 A1 | 6/2006 | Bell |
| 2006/0139314 A1 | 6/2006 | Bell |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 | 10/2006 | Tanaka et al. |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 | 12/2006 | Rekimoto |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 | 6/2007 | Chen et al. |
| 2007/0139932 A1 | 6/2007 | Sun et al. |
| 2007/0152977 A1 | 7/2007 | Ng et al. |
| 2007/0152984 A1 | 7/2007 | Ording et al. |
| 2007/0152986 A1 | 7/2007 | Ogawa |
| 2007/0160362 A1 | 7/2007 | Mitsuo et al. |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0215451 A1 | 9/2007 | Sasloff et al. |
| 2007/0236454 A1 | 10/2007 | Ung et al. |
| 2007/0247435 A1 | 10/2007 | Benko et al. |
| 2007/0273842 A1 | 11/2007 | Morrison et al. |
| 2008/0012835 A1 | 1/2008 | Rimon et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0143682 A1 | 6/2008 | Shim et al. |
| 2008/0150913 A1 | 6/2008 | Bell et al. |
| 2008/0158170 A1 | 7/2008 | Herz et al. |
| 2008/0259050 A1 | 10/2008 | Lin et al. |
| 2008/0259052 A1 | 10/2008 | Lin et al. |
| 2008/0259053 A1 | 10/2008 | Newton |
| 2009/0030853 A1 | 1/2009 | De La Motte |
| 2009/0058832 A1 | 3/2009 | Newton |
| 2009/0058833 A1 | 3/2009 | Newton |
| 2009/0077504 A1 | 3/2009 | Bell et al. |
| 2009/0122027 A1 | 5/2009 | Newton |

| | | | | | | |
|---|---|---|---|---|---|---|
| 2009/0135162 | A1 | 5/2009 | Van De Wijdeven et al. | CN | 101802760 | 8/2010 |
| 2009/0141002 | A1 | 6/2009 | Sohn et al. | DE | 3836429 | 5/1990 |
| 2009/0146972 | A1 | 6/2009 | Morrison et al. | DE | 19810452 | 12/1998 |
| 2009/0207144 | A1 | 8/2009 | Bridger | DE | 60124549 | 9/2007 |
| 2009/0213093 | A1 | 8/2009 | Bridger | DE | 102007021537 | 6/2008 |
| 2009/0213094 | A1 | 8/2009 | Bridger | EP | 0125068 | 11/1984 |
| 2009/0219256 | A1 | 9/2009 | Newton | EP | 0181196 | 5/1986 |
| 2009/0237376 | A1 | 9/2009 | Bridger | EP | 0279652 | 8/1988 |
| 2009/0278816 | A1 | 11/2009 | Colson | EP | 0347725 | 12/1989 |
| 2009/0284495 | A1 | 11/2009 | Geaghan et al. | EP | 0420335 | 4/1991 |
| 2009/0295755 | A1 | 12/2009 | Chapman et al. | EP | 0657841 | 6/1995 |
| 2009/0309844 | A1 | 12/2009 | Woo et al. | EP | 0762319 | 3/1997 |
| 2009/0309853 | A1 | 12/2009 | Hildebrandt et al. | EP | 0829798 | 3/1998 |
| 2010/0009098 | A1 | 1/2010 | Bai et al. | EP | 0843202 | 5/1998 |
| 2010/0045629 | A1 | 2/2010 | Newton | EP | 0897161 | 2/1999 |
| 2010/0045634 | A1 | 2/2010 | Su et al. | EP | 0911721 | 4/1999 |
| 2010/0079412 | A1 | 4/2010 | Chiang et al. | EP | 1059605 | 12/2000 |
| 2010/0085330 | A1 | 4/2010 | Newton | EP | 1262909 | 12/2002 |
| 2010/0090985 | A1 | 4/2010 | Newton | EP | 1297488 | 4/2003 |
| 2010/0090987 | A1 | 4/2010 | Lin et al. | EP | 1420335 | 5/2004 |
| 2010/0103143 | A1 | 4/2010 | Newton et al. | EP | 1450243 | 8/2004 |
| 2010/0177052 | A1 | 7/2010 | Chang et al. | EP | 1457870 | 9/2004 |
| 2010/0182279 | A1 | 7/2010 | Juni | EP | 1471459 | 10/2004 |
| 2010/0193259 | A1 | 8/2010 | Wassvik | EP | 1517228 | 3/2005 |
| 2010/0207911 | A1 | 8/2010 | Newton | EP | 1550940 | 7/2005 |
| 2010/0225588 | A1 | 9/2010 | Newton et al. | EP | 1577745 | 9/2005 |
| 2010/0229090 | A1 | 9/2010 | Newton et al. | EP | 1599789 | 11/2005 |
| 2010/0315379 | A1 | 12/2010 | Allard et al. | EP | 1611503 | 1/2006 |
| 2011/0019204 | A1 | 1/2011 | Bridger | EP | 1674977 | 6/2006 |
| 2011/0050649 | A1 | 3/2011 | Newton et al. | EP | 1736856 | 12/2006 |
| 2011/0199335 | A1 | 8/2011 | Li et al. | EP | 1739528 | 1/2007 |
| 2011/0199387 | A1 | 8/2011 | Newton | EP | 1739529 | 1/2007 |
| 2011/0205151 | A1 | 8/2011 | Newton et al. | EP | 1741186 | 1/2007 |
| 2011/0205155 | A1 | 8/2011 | Newton et al. | EP | 1759378 | 3/2007 |
| 2011/0205185 | A1 | 8/2011 | Newton et al. | EP | 1766501 | 3/2007 |
| 2011/0205186 | A1 | 8/2011 | Newton et al. | EP | 1830248 | 9/2007 |
| | | | | EP | 1877893 | 1/2008 |
| FOREIGN PATENT DOCUMENTS | | | | EP | 2135155 | 12/2009 |
| | | | | EP | 2195726 | 6/2010 |
| AU | 2003233728 | | 12/2003 | EP | 2250546 | 11/2010 |
| AU | 2004211738 | | 8/2004 | ES | 2279823 | 9/2007 |
| AU | 2006243730 | | 11/2006 | FR | 2521330 | 8/1983 |
| CA | 2058219 | | 4/1993 | GB | 1575420 | 9/1980 |
| CA | 2367864 | | 4/1993 | GB | 2176282 | 12/1986 |
| CA | 2219886 | | 4/1999 | GB | 2204126 | 11/1988 |
| CA | 2251221 | | 4/1999 | GB | 2263765 | 8/1993 |
| CA | 2267733 | | 10/1999 | JP | 57211637 | 12/1982 |
| CA | 2268208 | | 10/1999 | JP | 58146928 | 9/1983 |
| CA | 2252302 | | 4/2000 | JP | 61196317 | 8/1986 |
| CA | 2412878 | | 1/2002 | JP | 61260322 | 11/1986 |
| CA | 2341918 | | 9/2002 | JP | 62005428 | 1/1987 |
| CA | 2350152 | | 12/2002 | JP | 63223819 | 9/1988 |
| CA | 2386094 | | 12/2002 | JP | 1061736 | 3/1989 |
| CA | 2372868 | | 8/2003 | JP | 1154421 | 6/1989 |
| CA | 2390503 | | 12/2003 | JP | 3054618 | 3/1991 |
| CA | 2390506 | | 12/2003 | JP | 3244017 | 10/1991 |
| CA | 2432770 | | 12/2003 | JP | 4350715 | 12/1992 |
| CA | 2493236 | | 12/2003 | JP | 4355815 | 12/1992 |
| CA | 2448603 | | 5/2004 | JP | 5181605 | 7/1993 |
| CA | 2453873 | | 7/2004 | JP | 5189137 | 7/1993 |
| CA | 2460449 | | 9/2004 | JP | 5197810 | 8/1993 |
| CA | 2521418 | | 10/2004 | JP | 6110608 | 4/1994 |
| CA | 2481396 | | 3/2005 | JP | 7110733 | 4/1995 |
| CA | 2491582 | | 7/2005 | JP | 7160403 | 6/1995 |
| CA | 2563566 | | 11/2005 | JP | 7230352 | 8/1995 |
| CA | 2564262 | | 11/2005 | JP | 8016931 | 2/1996 |
| CA | 2501214 | | 9/2006 | JP | 8108689 | 4/1996 |
| CA | 2606863 | | 11/2006 | JP | 8506193 | 7/1996 |
| CA | 2580046 | | 9/2007 | JP | 8240407 | 9/1996 |
| CA | 2515955 | | 1/2011 | JP | 8315152 | 11/1996 |
| CN | 1277349 | | 12/2000 | JP | 9091094 | 4/1997 |
| CN | 1407506 | | 4/2003 | JP | 9224111 | 8/1997 |
| CN | 1440539 | | 9/2003 | JP | 9319501 | 12/1997 |
| CN | 1774692 | | 5/2006 | JP | 10031546 | 2/1998 |
| CN | 1784649 | | 6/2006 | JP | 10105324 | 4/1998 |
| CN | 1310126 | | 4/2007 | JP | 10162698 | 6/1998 |
| CN | 101019096 | | 8/2007 | JP | 10254623 | 9/1998 |
| CN | 101023582 | | 8/2007 | JP | 11045155 | 2/1999 |
| CN | 101663637 | | 3/2010 | JP | 11051644 | 2/1999 |
| CN | 101802759 | | 8/2010 | | | |

| | | |
|---|---|---|
| JP | 11064026 | 3/1999 |
| JP | 11085376 | 3/1999 |
| JP | 11110116 | 4/1999 |
| JP | 11203042 | 7/1999 |
| JP | 11212692 | 8/1999 |
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO2008128096 | 10/2008 |
| WO | WO2009029764 | 3/2009 |
| WO | WO2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Canadian Patent Application No. 2412878, Office Action, mailed May 12, 2009, 4 pages.
Chinese Patent Application No. 200880105040.5, Office Action, at least as early as Aug. 11, 2011, 6 pages. (English Translation Not Available).
"Composite List of Projects 1983 to 1989", *NASA Small Business Innovation Research Program*, Aug. 1990, 132 pages.
"Digital Vision Touch Technology", White Paper, *SMART Technologies Inc.*, Feb. 2003, 10 pages.
European Application No. 02253594.2, European Search Report, mailed Jan. 5, 2006, 3 pages.
European Application No. 03257166.3, Partial European Search Report, mailed May 29, 2006, 4 pages.
European Application No. 04251392.9, European Search Report, mailed Jan. 18, 2007, 3 pages.
European Application No. 04711522.5, Office Action, mailed Jun. 29, 2010, 8 pages.
European Application No. 04711522.5, Office Action, mailed Mar. 22, 2010, 1 page.
European Application No. 04711522.5, Supplementary European Search Report, mailed Mar. 3, 2010, 3 pages.
European Application No. 06019268.9, European Search Report and Search Opinion, mailed Nov. 24, 2006, 5 pages.
European Application No. 06019269.7, European Search Report and Search Opinion, mailed Nov. 23, 2006, 5 pages.
European Application No. 07250888.0, European Search Report and Search Opinion, mailed Jun. 22, 2007, 6 pages.
European Application No. 07701682.2, Supplementary European Search Report and Search Opinion, mailed Dec. 7, 2010, 10 pages.
European Application No. 08745663.8, Office Action, mailed Dec. 27, 2010, 13 pages.
European Application No. 08745663.8, Office Action, mailed Jul. 6, 2010, 6 pages.
Förstner, "On Estimating Rotations", *Institut für Photogrammetrie, Universität Bonn*, 12 pages.
Fukushige, et al., "Interactive 3D Pointing Device Using Mirror Reflections", *Graduate School of Engineering, Osaka University*, 2006, 231-235.
Funk, "CCDs in optical touch panels deliver high resolution", *Electronic Design*, Sep. 27, 1980, pp. 139-143.
Geer, "Will Gesture—Recognition Technology Point the Way?", *Industry Trends*, Oct. 2004, 20-23.
Hartley, "Multiple View Geometry in Computer Vision", *Cambridge University Press* First published 2000, Reprinted (with corrections) 2001, pp. 70-73, 92-93, and 98-99.
Heddier Electronic, "Store Window Presentations", Feb. 2, 2011, 2 pages.
Herot, et al., "One-Point Touch Input of Vector Information for Computer Displays", *Architecture Machine Group Massachusetts Institute of Technology* Cambridge, Massachusetts, Oct. 31, 1977, pp. 210-216.
Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.
Hu, et al., "Multiple-view 3-D Reconstruction Using a Mirror", *The University of Rochester*, May 2005, 14 pages.
International Application No. PCT/CA2001/00980, International Search Report, mailed Oct. 22, 2001, 3 pages.

International Application No. PCT/CA2004/001759, International Search Report and Written Opinion, mailed Feb. 21, 2005, 7 pages.
International mailed Application No. PCT/CA2007/002184, International Search Report, Mar. 13, 2008, 3 pages.
International Application No. PCT/CA2008/001350, International Search Report, mailed Oct. 17, 2008, 5 pages.
International Application No. PCT/CA2009/000733, International Search Report and Written Opinion, mailed Sep. 10, 2009, 6 pages.
International Application No. PCT/CA2010/001085, International Search Report, mailed Oct. 12, 2010, 4 pages.
International Application No. PCT/NZ2004/000029, International Preliminary Report on Patentability, issued May 20, 2005, 21 pages.
International Application No. PCT/NZ2004/000029, International Search Report and Written Opinion, mailed Jun. 10, 2004, 6 pages.
International Application No. PCT/NZ2005/000092, International Preliminary Report on Patentability, completed Dec. 30, 2006, 3 pages.
International Application No. PCT/NZ2005/000092, International Search Report, mailed Sep. 27, 2006, 4 pages.
International Application No. PCT/NZ2010/000049, International Search Report and Written Opinion, mailed Oct. 14, 2010, 12 pages.
International Application No. PCT/NZ2010/000051, International Search Report and Written Opinion, mailed Oct. 5, 2010, 15 pages.
International Application No. PCT/US2008/060102, International Preliminary Report on Patentability, mailed Oct. 22, 2009, 10 pages.
International Application No. PCT/US2008/060102, International Search Report and Written Opinion, mailed Feb. 12, 2009, 20 pages.
International Application No. PCT/US2008/074749, International Preliminary Report on Patentability, issuance Mar. 2, 2010, 9 pages.
International Application No. PCT/US2008/074749, International Search Report and Written Opinion, mailed Feb. 11, 2009, 15 pages.
International Application No. PCT/US2008/074755, International Preliminary Report on Patentability, issuance Mar. 2, 2010, 8 pages.
International Application No. PCT/US2008/074755, International Search Report and Written Opinion, mailed Jan. 29, 2009, 8 pages.
International Application No. PCT/US2009/030694, International Preliminary Report on Patentability, completion Apr. 26, 2010, 10 pages.
International Application No. PCT/US2009/030694, International Search Report, mailed Aug. 5, 2009, 5 pages.
International Application No. PCT/US2009/033624, International Preliminary Report on Patentability and Written Opinion, issuance Aug. 17, 2010, 6 pages.
International Application No. PCT/US2009/033624, International Search Report, mailed Mar. 29, 2010, 3 pages.
International Application No. PCT/US2009/042547, International Preliminary Report on Patentability, mailed Nov. 9, 2010, 6 pages.
International Application No. PCT/US2009/042547, International Search Report and Written Opinion, mailed Sep. 2, 2010, 12 pages.
International Application No. PCT/US2009/058682, International Search Report and Written Opinion, mailed Apr. 27, 2010, 15 pages.
International Application No. PCT/US2009/059193, International Search Report and Written Opinion, mailed Dec. 7, 2009, 15 pages.
International Application No. PCT/US2010/059050, International Search Report and Written Opinion, mailed Mar. 23, 2011, 9 pages.
International Application No. PCT/US2010/059104, International Search Report and Written Opinion, mailed Jun. 6, 2011, 14 pages.
International Application No. PCT/US2010/059078, International Search Report and Written Opinion, mailed Aug. 2, 2011, 17 pages.
"Introducing the NextWindow 1900 Optical Touch Screen", *A NextWindow White Paper, Next Window Human Touch*, May 22, 2007, 13 pages.
IntuiFace Press Release, "IntuiLab introduces IntuiFace, an interactive table and its application platform", Nov. 30, 2007, 1 page.
IntuiLab, "Overview Page", Mar. 9, 2011, 1 page.
Japanese Patent Application No. 2005-000268, Office Action, mailed Jul. 5, 2010, Office Action—3 pages, English Translation—3 pages.
Japanese Patent Application No. 2006-502767, Office Action, mailed Jan. 20, 2009, Office Action—2 pages, English Translation—3 pages.
Japanese Patent Application No. 2006-502767, Office Action, mailed Jun. 22, 2010, Office Action—3 pages, English Translation—4 pages.
Japanese Patent Application No. 2007-511305, Office Action, mailed Feb. 1, 2011, Office Action—2 pages, English Translation—5 pages.
Kanatani, "Camera Calibration", *Geometric Computation for Machine Vision*, Oxford Engineering Science Series, 1993, 37(2): 56-63.
Korean Patent Application No. 10-2005-7014885, Office Action, dated Aug. 9, 2010, English Translation—5 pages.
Lane, et al., "Reflective Interaction in Virtual Environments", *Eurographics*, 2001, 20(3): 7 pages.
Lo, "Solid-state image sensor: technologies and applications", SPIE Proceedings, 1998, 3422: 70-80.
Loinaz, et al., "A 200-mW, 3.3-V, CMOS Color Camera IC Producing 352×288 24-b Video at 30 Frames", *IEEE Journal of Solid-State Circuits*, Dec. 1998, 33(12); 2092-2103.
Piccardi, et al., "Background subtraction techniques: a review", *2004 IEEE International Conference on Systems, Man and Cybernetics*, Oct. 10, 2004, 4: 3099-3104.
Pogue, "The Multi-Touch Screen", *Pogue's Posts*, Mar. 27, 2007, 13 pages.
Singapore Patent Application No. 201001122-9, Office Action, dated May 3, 2011, 9 pages.
Tappert, et al., "On-Line Handwriting Recognition—A Survey", *Proceedings of the $9^{th}$ International Conference on Pattern Recognition (ICPR), Rome*, IEEE Computer Society Press, Nov. 14-17, 1988, 2: 1123-1132.
"ThruGlass™ Projected Capacitive Touchscreens Specifications", *Micro Touch*, 2000, 4 pages.
"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol. 5, Nos. 2-3.
"Touch Panel", *Veritas et Visus*, Nov. 2010, vol. 5, No. 4.
Photobit Corporation, "VGA-format CMOS Camera-on-a-Chip for Multimedia Applications", 1999, 2 pages.
Villamor, et al., "Touch Gesture Reference Guide", Last updated Apr. 15, 2010, 7 pages.
Wang, et al., "Stereo camera calibration without absolute world coordinate information", *SPIE*, Jun. 14, 1995, 2620: 655-662.
Wrobel, et al., "Minimum Solutions for Orientation", *Calibration and Orientation of Cameras in Computer Vision, Springer Series in Information Sciences*, 2001, 34: 28-33.
Japanese Patent Application No. 2007-511305, Office Action, mailed Sep. 6, 2011, Office Action—3 pages, English Translation—4 pages.

\* cited by examiner

TOUCH SCREEN SIGNAL PROCESSING

This application is a divisional application of U.S. patent application Ser. No. 11/033,183, filed Jan. 11, 2005 now U.S. Pat. No. 7,629,967, which is a continuation of Application No. PCT NZ2004/000029, published as WO 2004/072843, filed Feb. 16, 2004, which claims priority to NZ Application No. 524211, filed Feb. 14, 2003, each of which is incorporated by reference herein in its entirety.

TECHNICAL FIELD

The present invention relates to a touch sensitive screen and in particular to optically detecting the presence of an object by using signal processing.

BACKGROUND PRIOR ART

Touch screens of the prior art can take on five main forms. These five forms of touch screen input device include resistive, capacitive, surface acoustic wave (SAW), infrared (IR), and optical. Each of these types of touch screen has its own features, advantages and disadvantages.

Resistive is the most common type of touch screen technology. It is a low-cost solution found in many touch screen applications, including hand-held computers, PDA's, consumer electronics, and point-of-sale-applications. A resistive touch screen uses a controller and a specifically coated glass overlay on the display face to produce the touch connection. The primary types of resistive overlays are 4-wire, 5-wire, and 8 wires. The 5-wire and 8-wire technologies are more expensive to manufacture and calibrate, while 4-wire provides lower image clarity. Two options are generally given: polished or anti-glare. Polished offers clarity of image, but generally introduces glare. Anti-glare will minimize glare, but will also further diffuse the light thereby reducing the clarity. One benefit of using a resistive display is that it can be accessed with a finger (gloved or not), pen, stylus, or a hard object. However, resistive displays are less effective in public environments due to the degradation in image clarity caused by the layers of resistive film, and its susceptibility to scratching. Despite the trade-offs, the resistive screen is the most popular technology because of its relatively low price (at smaller screen sizes), and ability to use a range of input means (fingers, gloves, hard and soft stylus).

Capacitive touch screens are all glass and designed for use in ATM's and similar kiosk type applications. A small current of electricity runs across the screen with circuits located at the corners of the screen to measure the capacitance of a person touching the overlay. Touching the screen interrupts the current and activates the software operating the kiosk. Because the glass and bezel that mounts it to the monitor can be sealed, the touch screen is both durable and resistant to water, dirt and dust. This makes it commonly used in harsher environments like gaming, vending retail displays, public kiosks and industrial applications. However, the capacitive touch screen is only activated by the touch of a human finger and a gloved finger, pen, stylus or hard object will not work. Hence, it is inappropriate for use in many applications, including medical and food preparation.

Surface acoustic wave (SAW) technology provides better image clarity because it uses pure glass construction. A SAW touch screen uses a glass display overlay. Sound waves are transmitted across the surface of the display. Each wave is spread across the screen by bouncing off reflector arrays along the edges of the overlay. Two receivers detect the waves. When the user touches the glass surface, the user's finger absorbs some of the energy of the acoustic wave and the controller circuitry measures the touch location. SAW touch screen technology is used in ATM's, Amusements Parks, Banking and Financial Applications and kiosks. The technology is not able to be gasket sealed, and hence is not suitable to many industrial or commercial applications. Compared to resistive and capacitive technologies, it provides superior image clarity, resolution, and higher light transmission.

Infrared technology relies on the interruption of an infrared light grid in front of the display screen. The touch frame or opto-matrix frame contains a row of infrared LEDs and photo transistors; each mounted on two opposite sides to create a grid of invisible infrared light. The frame assembly is comprised of printed wiring boards on which the opto-electronics are mounted and is concealed behind an infrared-transparent bezel. The bezel shields the opto-electronics from the operating environment while allowing the infrared beams to pass through. The infrared controller sequentially pulses the LEDs to create a grid of infrared light beams. When a stylus, such as a finger, enters the grid, it obstructs the beams. One or more phototransistors detect the absence of light and transmit a signal that identifies the x and y coordinates. Infrared touch screens are often used in manufacturing and medical applications because they can be completely sealed and operated using any number of hard or soft objects. The major issue with infrared is the "seating" of the touch frame is slightly above the screen. Consequently, it is susceptible to "early activation" before the finger or stylus has actually touched the screen. The cost to manufacture the infrared bezel is also quite high.

Optical imaging for touch screens uses a combination of line-scan cameras, digital signal processing, front or back illumination and algorithms to determine a point of touch. The imaging lenses image the user's finger, stylus or object by scanning along the surface of the display. This type of touch screen is susceptible to false readings due to moving shadows and bright lights and also requires that the screen be touched before a reading is taken. Attempts have been made to overcome these disadvantages. Touch screens using optical imaging technology are disclosed in the following publications.

A touch screen using digital ambient light sampling is disclosed in U.S. Pat. No. 4,943,806, in particular this patent discloses a touch input device that continuously samples and stores ambient light readings and compares these with previously taken readings. This is done to minimise the effect of bright light and shadows.

A touch screen for use with a computer system is disclosed in U.S. Pat. No. 5,914,709. In particular a user input device sensitive to touch is disclosed that uses threshold adjustment processing. A light intensity value is read and an "ON" threshold is established, this threshold measurement and adjustment is frequently and periodically performed.

This U.S. Pat. No. 5,317,140 patent discloses a method for optically determining the position and direction of an object on a touch screen display. In particular, a diffuser is positioned over the light sources to produce an average light intensity over the touch screen.

U.S. Pat. No. 5,698,845 discloses a touch screen display that uses an optical detection apparatus to modulate the ON/OFF frequency of light emitters at a frequency of twice the commercial AC line source. The receiver determines the presence of light and compares this to the actual signal transmitted.

U.S. Pat. No. 4,782,328 discloses a touch screen that uses a photosensor unit positioned at a predetermined height above the touch screen, and when a pointer nears the touch screen, rays of its reflected or shadowed ambient light allow it to be sensed.

U.S. Pat. No. 4,868,551 discloses a touch screen that can detect a pointer near the surface of the display by detecting light reflected by the pointer (reflected or diffusive).

DISCLOSURE OF THE INVENTION

It is an object of the present invention to provide a touch sensitive screen which goes someway to overcoming the above mentioned disadvantages or which will at least provide the public with a useful choice.

Accordingly in a first aspect the invention may broadly be said to consist in a touch display comprising:

a screen for a user to touch and view an image on or through;

light sources at one or more edges of said screen, said light sources directing light across the surface of said screen;

at least two cameras having outputs, each said camera located at the periphery of said screen to image the space in front of said screen, said output including a scanned Image;

means for processing said outputs to detect the level of light, said light including:
    direct light from said light sources, and/or
    reflected light from said light sources;

a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said light sources are behind said screen arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said touch display including:

means for modulating said light from said light sources to provide a frequency band within the imageable range of said cameras;

means for excluding image data outside said frequency band.

Preferably said means for processing said outputs includes said means for excluding image data outside said frequency band and said means for excluding image data outside said frequency includes filtering.

Preferably said filtering includes applying a filter selected from the group consisting of:
    a comb filter;
    a high pass filter;
    a notch filter; and
    a band pass filter.

Preferably said touch display including
    means for controlling said light sources; and
    means for taking and processing an image taken in a non lighted ambient light state and in a lighted state;

wherein said means for processing said outputs subtracts the ambient state from the lighted state before detecting the level of light.

Preferably said said light sources are LEDs and said touch display includes means for controlling the operation of sections of said light source independent of other sections of said light source.

Preferably means for controlling the operation of sections of said light source includes means for independently controlling the effective intensity of said light source.

Preferably said means for controlling sections of said light source comprises wiring said sections in antiphase and driving using a bridge drive.

Preferably means for controlling sections of said light source comprises using a diagonal bridge drive.

Preferably said means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some section are lighted and others are not when an image is taken.

Accordingly in a second aspect the invention may broadly be said to consist in a touch display comprising:

a screen for a user to touch and view an image on or through;

light sources at one or more edges edge of said screen, said light sources directing light across the surface of said screen;

at least two cameras having outputs located at the periphery of said screen, said cameras located so as not to receive direct light from said light sources, each said camera imaging the space in front of said screen, said output including a scanned image;

means for processing said outputs to detect level of reflected light; and a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said touch display including:

means for modulating said light from said light sources to provide a frequency band within the imageable range of said cameras;

means for excluding image data outside said frequency band.

Preferably said means for processing said outputs includes said means for excluding image data outside said frequency band and said means for excluding image data outside said frequency includes filtering.

Preferably filtering includes applying a filter selected from the group consisting of:
    a comb filter;
    a high pass filter;
    a notch filter; and
    a band pass filter.

Preferably said touch display including:
   means for controlling said light sources; and
   means for taking and processing an image taken in a non lighted ambient light state and in a lighted state;
   wherein said means for processing said outputs subtracts the ambient state from the lighted state before detecting the level of light.

Preferably said light sources are LEDs and said touch display includes means for controlling the operation of sections of said light source independent of other sections of said light source.

Preferably means for controlling the operation of sections of said light source includes means for independently controlling the effective intensity of said light source.

Preferably the means for controlling sections of said light source comprises wiring said sections in antiphase and driving using a bridge drive.

Preferably the means for controlling sections of said light source comprises using a diagonal bridge drive.

Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some sections are lighted and others are not when an image is taken.

Preferably said screen is reflective, said camera further images said screen, and said means for processing outputs detects the level of light from the mirror image.

Preferably said processed out put indicates the relative bearing of a presumed object relative to said camera and the distance of said object from said screen.

Accordingly in a third aspect the invention may broadly be said to consist in a method of receiving user inputs in reference to an image including the steps of:
   providing a screen for a user to touch and view an image on or through;
   providing light sources at one or more edges of said screen, said light sources directing light across the surface of said screen;
   providing at least two cameras having outputs, each said camera located at the periphery of said screen to image the space in front of said screen, said output including a scanned image;
   processing said outputs to detect the level of light, said light including:
      direct light from said light sources, and/or
      reflected light from said light sources;
   processing the processed outputs of said cameras, using triangulation techniques to obtain the location of said object.

Preferably said processed output indicates the relative bearing of a presumed object location relative to a said camera.

Preferably said processed output indicates the relative bearing of a presumed object location relative to the centre of the lens of said camera.

Preferably said location of is a planar screen co-ordinate.

Preferably said light sources are behind said screen and arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said method including the steps of:
   modulating said light from said light sources to provide a frequency band within the imageable range of said cameras;
   excluding image data outside said frequency band.

Preferably the step of processing said outputs includes the steps of excluding image data outside said frequency band and said step of excluding image data outside said frequency includes filtering.

Preferably filtering includes the step of applying a filter selected from the group consisting of:
   a comb filter;
   a high pass filter;
   a notch filter; and
   a band pass filter.

Preferably said method including the steps of:
   controlling said light sources; and
   taking and processing an image taken in a non lighted ambient light state and in a lighted state;
   wherein said step of processing said outputs subtracts the ambient state from the lighted state before detecting the level of light.

Preferably said light sources are LEDs and said touch display includes means for controlling the operation of sections of said light source independent of other sections of said light source.

Preferably the step of controlling the operation of sections of said light source includes independently controlling the effective intensity of said light source.

Preferably the step of controlling sections of said light source comprises wiring said sections in antiphase and driving using a bridge drive.

Preferably the step of controlling sections of said light source comprises using a diagonal bridge drive.

Preferably the step of controlling sections of said light source comprises using a shift register for each section to be controlled.

Preferably the step of taking and processing images includes controlling sections of said light sources and each said camera and said step of processing said outputs includes processing information on whether a said section is lighted or not.

Preferably some sections are lighted and others are not when an image is taken.

Accordingly in a fourth aspect the invention may broadly be said to consist in a method of receiving user inputs in reference to an image including the steps of:
   providing a screen for a user to touch and view an image on or through;
   providing light sources at one or more edges edge of said screen, said light sources directing light across the surface of said screen;
   providing at least two cameras having outputs located at the periphery of said screen, said cameras located so as not to receive direct light from said light sources, each said camera imaging the space in front of said screen, said output including a scanned image;
   processing said outputs to detect level of reflected light; and
   processing the processed outputs of said cameras, employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said method including:
means for modulating said light from said light sources to provide a frequency band within the imageable range of said cameras;
means for excluding image data outside said frequency band.

Preferably said means for processing said outputs includes said means for excluding image data outside said frequency band and said means for excluding image data outside said frequency includes filtering.

Preferably filtering includes applying a filter selected from the group consisting of:
a comb filter;
a high pass filter;
a notch filter; and
a band pass filter.

Preferably said method including
means for controlling said light sources; and
means for taking and processing an image taken in a non lighted ambient light state and in a lighted state;
wherein said means for processing said outputs subtracts the ambient state from the lighted state before detecting the level of light.

Preferably said light sources are LEDs and said touch display includes means for controlling the operation of sections of said light source independent of other sections of said light source.

Preferably the means for controlling the operation of sections of said light source includes means for independently controlling the effective intensity of said light source.

Preferably the means for controlling sections of said light source comprises wiring said sections in antiphase and driving using a bridge drive.

Preferably the means for controlling sections of said light source comprises using a diagonal bridge drive.

Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some sections are lighted and others are not when an image is taken.

Preferably said screen is reflective, said camera further images said screen, and said means for processing outputs detects the level of light from the mirror image.

Preferably said processed out put indicates the relative bearing of a presumed object relative to said camera and the distance of said object from said screen.

Accordingly in a fifth aspect the invention may broadly be said to consist in a method of receiving user inputs in reference to an image:
providing at least one light sources on or adjacent the periphery of said image, said light sources directing light across said image;
detecting at least two locations on or adjacent the periphery of said image, the level of light and providing said level as an output;
processing said outputs using triangulation techniques to determine whether said outputs indicate the presence of an object proximate to said image and if so the location of said object.

Preferably said locations are substantially non-opposite so that when an object is present said output is substantially indicative of light reflected from said object.

Accordingly in a sixth aspect the invention may broadly be said to consist in a user input device for locating an object with reference to an image comprising:
at least one light source at or proximate to the periphery of said image, said light source directing light across said image;
at one detector having an output, said detector located or in proximity to said image to image the space in front of said screen, said output indicative of a level of light;
a processor receiving said outputs and using triangulation techniques and said outputs determining the presence of said object and if so the location of said object.

BRIEF DESCRIPTION OF THE DRAWINGS

One preferred form of the present invention will now be described with reference to the accompanying drawings in which.

BEST MODE FOR CARRYING OUT THE INVENTION

The present invention relates to improvements in signal processing in the field of optical imaging touch screens. In the preferred embodiment the optical touch screen uses front illumination and is comprised of a screen, a series of light sources, and at least two area scan cameras located in the same plane and at the periphery of the screen. In another embodiment, the optical touch screen uses backlight illumination; the screen is surrounded by an array of light sources located behind the touch panel which are redirected across the surface of the touch panel. At least two line scan cameras are used in the same plane as the touch screen panel. The signal processing improvements created by these implementations are that an object can be sensed when in close proximity to the surface of the touch screen, calibration is simple, and the sensing of an object is not effected by the changing ambient light conditions, for example moving lights or shadows.

Figure 3:
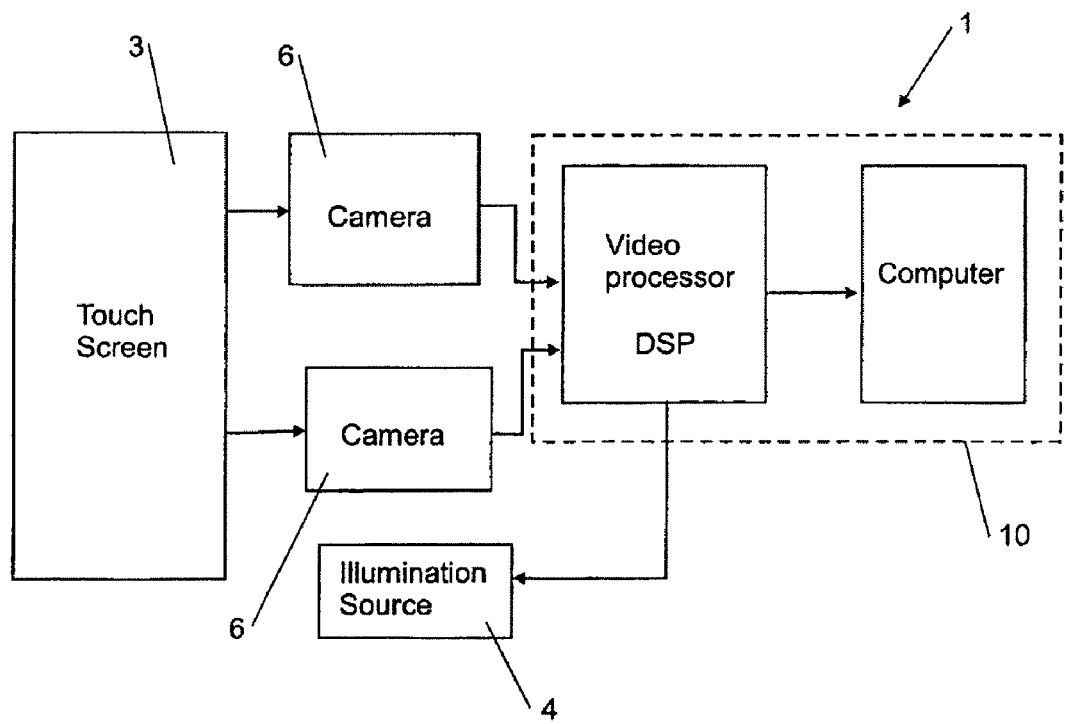
FIG. 3 is a block diagram of the system of the preferred embodiment of the touch screen of the present invention.

A block diagram of a general touch screen system 1 is shown in FIG. 3. Information flows from the cameras 6 to the video processing unit and computer, together referred to as the processing module 10. The processing module 10 performs many types of calculations including filtering, data sampling, and triangulation and controls the modulation of the illumination source 4.

Front Illumination Touch Screen

Figure 1:
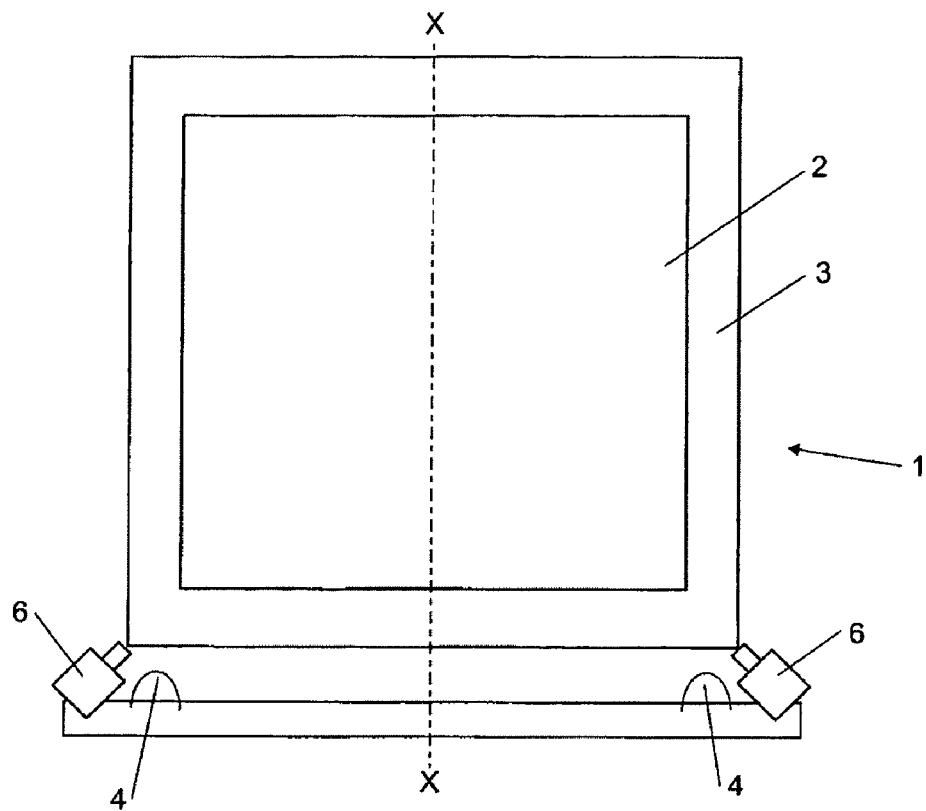
FIG. 1 is a diagrammatic illustration of a front view of the preferred embodiment of the touch screen of the present invention.

The preferred embodiment of the touch screen of the present invention is shown in FIG. 1. The touch screen system 1 is comprised of a monitor 2, a touch screen panel 3, at least two lights 4, a processing module (not shown) and at least two area scan cameras 6. The monitor 2, which displays information to the user, is positioned behind the touch screen panel 3. Below the touch screen panel 3 and the monitor 2 are the area scan cameras 6 and light sources 4. The light sources 4 are preferably Light Emitting Diodes (LED) but may be another type of light source, for example, a fluorescent tube. LEDs are ideally used as they may be modulated as required, they do not have an inherent switching frequency. The cameras 6 and LEDs 4 are in the same plane as the touch panel 3.

Figure 1A:
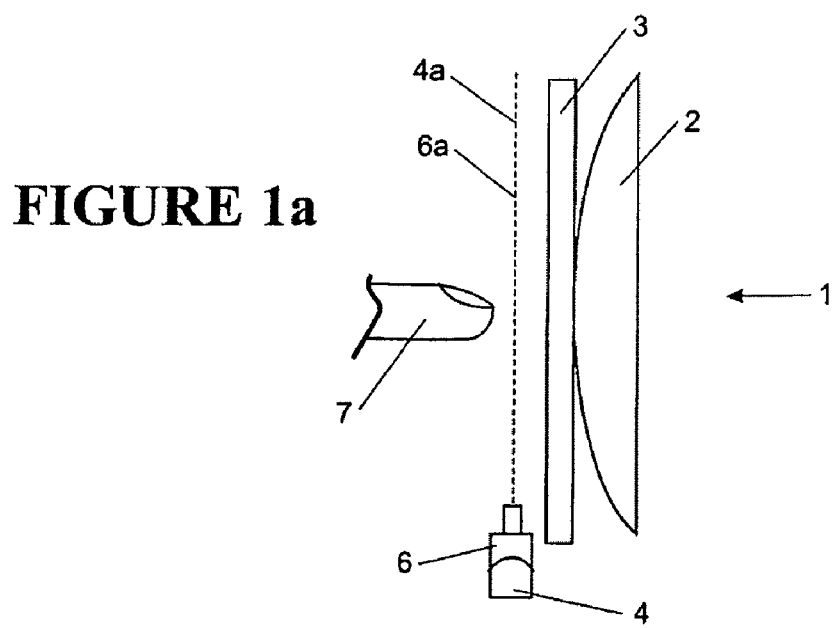
FIG. 1a is an illustration of a cross sectional view through X-X of FIG. 1.
Figure 1B:
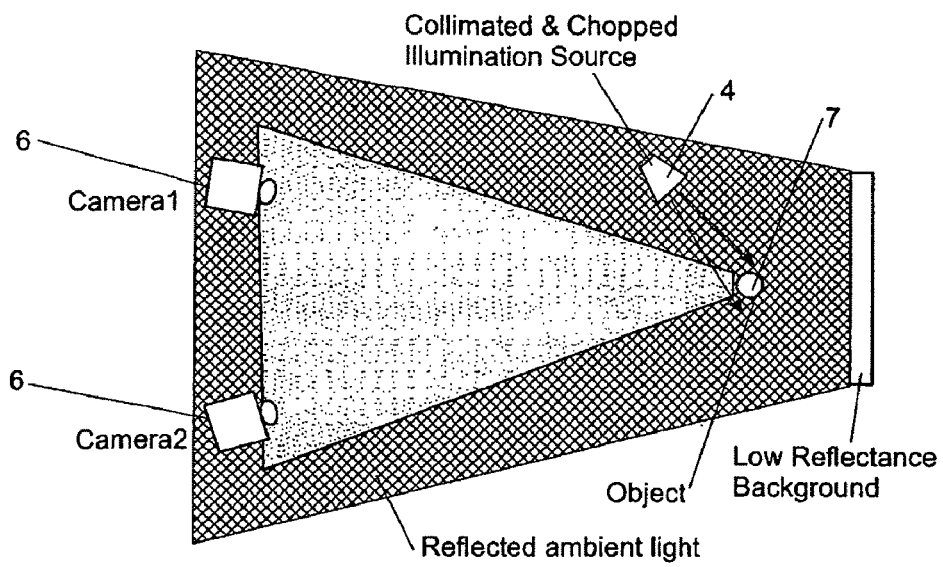
FIG. 1b is an illustration of front illumination of the preferred embodiment of the touch screen of the present invention.

Referring to FIG. 1a, the viewing field 6a of the area scan camera 6 and the radiation path 4a of the LEDs 4 are in the same plane and parallel to the touch panel 3. When an object 7, shown as a finger, enters into the radiation path 4a, it is illuminated. This is typically known as front panel illumination or object illumination. In FIG. 1b, this principle is again illustrated. Once a finger 7 enters into the radiation field 4a, a signal is reflected back to the camera 6. This indicates that a finger 7 is near to or touching the touch panel 3. In order to determine if the finger 7 is actually touching the touch panel 3, the location of the touch panel 3 must be established. This is performed using another signal, a mirrored signal.

Mirrored Signal

The mirrored signal occurs when the object 7 nears the touch panel 3. The touch panel 3 is preferably made from glass which has reflective properties. As shown in FIG. 2, the finger 7 is positioned at a distance 8 above the touch panel 3 and is mirrored 7a in the touch panel 3. The camera 6 (only shown as the camera lens) images both the finger 7 and the reflected image 7a. The image of finger 7 is reflected 7a in panel 3; this can be seen through the field lines 6b, 6c and virtual field line 6d. This allows the camera 6 to image the reflected 7a image of the finger 7. The data produced from the camera 6 corresponds to the position of the field lines 6e, 6b as they enter the camera 6. This data is then fed into a processing module 10 for analysis.

Figure 2A:
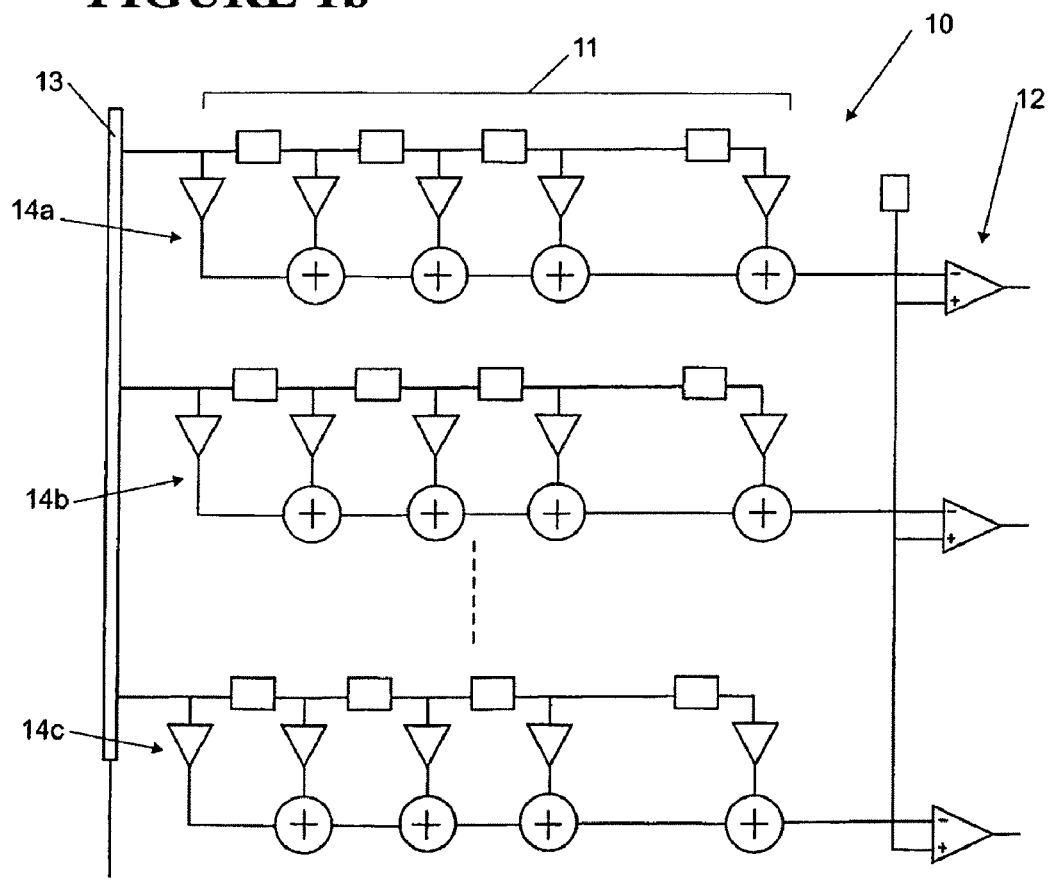
FIG. 2a is a block diagram of the filter implementation of the preferred embodiment of the touch screen of the present invention.
Figure 2:
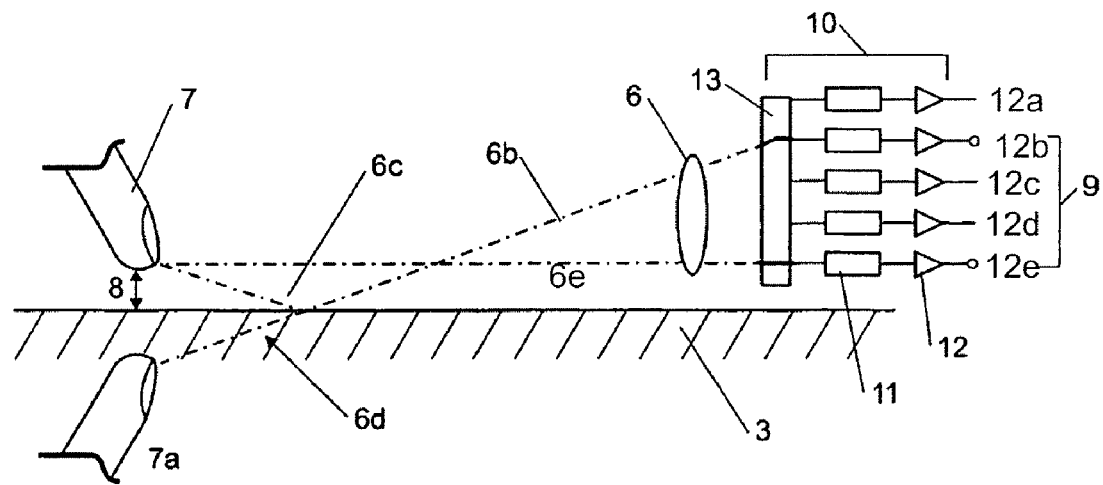
FIG. 2 is an illustration of the mirroring effect in the preferred embodiment of the touch screen of the present invention.
Figure 2B:
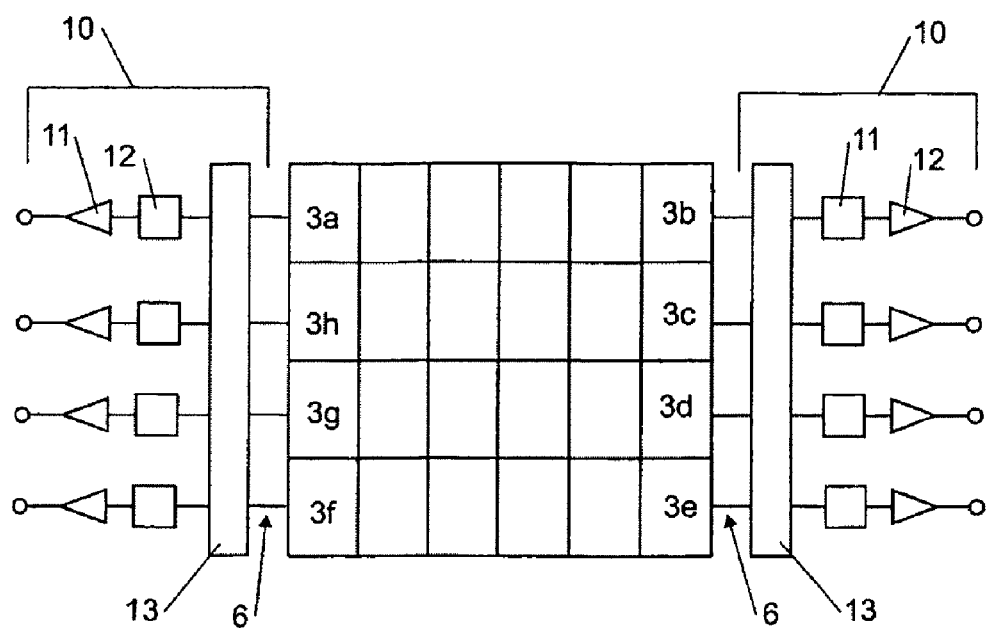
FIG. 2b is a diagrammatic illustration of the pixels seen by an area camera and transmitted to the processing module in the preferred embodiment of the present invention.

A section of the processing module 10 is shown in FIG. 2a. Within the processing module 10 is a series of scanning imagers 13 and digital filters 11 and comparators 12 implemented in software. There are a set number of pixels on the touch panel, for example 30,000 pixels. These may be divided up into 100 columns of 300 pixels. The number of pixels may be more or less than the numbers used, the numbers are used for example only. In this situation, there are 30,000 digital filters 11 and comparators 12, broken up into 100 columns of 300 pixels, this forms a matrix similar to the matrix of pixels on the monitor 2. A representation of this is shown in FIG. 2a as one column is serviced by one image scanner 13 and three sets 14a, 14b, 14c of digital filters 11 and comparators 12, this allows information from three pixels to be read. A more illustrated example of this matrix is shown in FIG. 2b. Eight pixels 3a-3h are connected, in groups of columns, to an image scanner 13 that is subsequently connected to a filter 11 and a comparator 12 (as part of the processing module 10). The numbers used in FIG. 2b are used for illustration only; an accurate number of pixels could be greater or less in number. The pixels shown in this diagram may not form this shape in the panel 3, their shape will be dictated by the position and type of camera 6 used.

Referring back to FIG. 2, finger 7 and mirrored finger 7a activates at least two pixels; two pixels are used for simplicity. This is shown by the field lines 6e and 6b entering the processing module 10. This activates the software so the two signals pass through a digital filter 11 and a comparator 12 and results in a digital signal output 12a-12e. The comparator 12 compares the output from the filter 11 to a predetermined threshold value. If there is a finger 7 detected at the pixel in question, the output will be high, otherwise it will be low.

The mirrored signal also provides information about the position of the finger 7 in relation to the cameras 6. It can determine the height 8 of the finger 7 above the panel 3 and its angular position. The information gathered from the mirrored signal is enough to determine where the finger 7 is in relation to the panel 3 without the finger 7 having to touch the panel 3.

Figure 4:
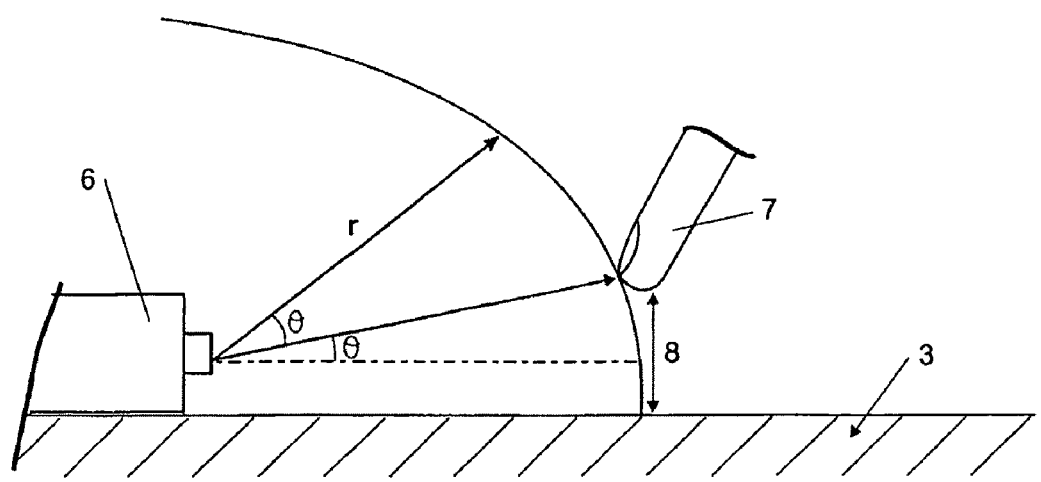
FIG. 4 is a side view of the determination of the position of an object using the mirrored signal in the preferred embodiment of the touch screen of the present invention.
Figure 4A:
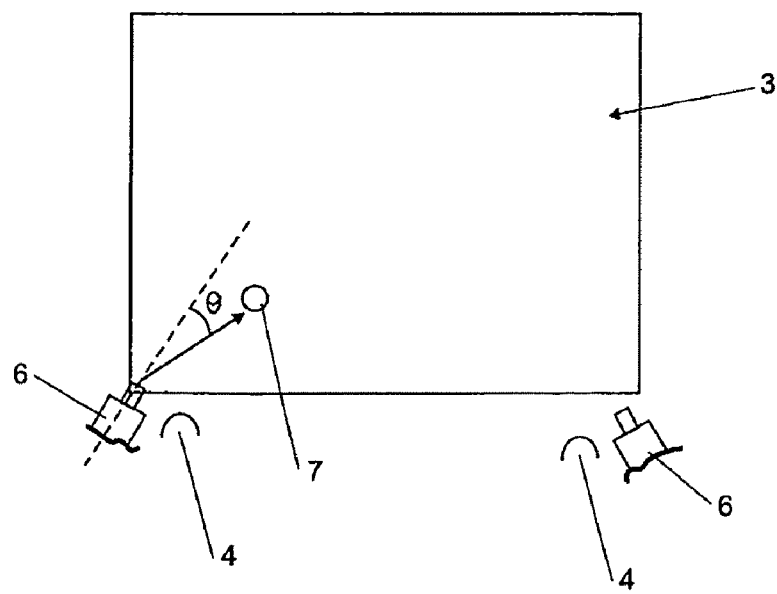
FIG. 4a is top view of the determination of the position of an object using the mirrored signal in the preferred embodiment of the touch screen of the present invention.

FIGS. 4 and 4a show the positional information that is able to be obtained from the processing of the mirrored signal. The positional information is given in polar co-ordinates. The positional information relates to the height of the finger 7, and the position of the finger 7 over the panel 3.

Referring again to FIG. 2, the height that the finger 7 is above the panel 3 can be seen in the distance between the outputs 12a-12e. In this example the finger 7 is a height 8 above the panel 3 and the outputs 12b and 12e are producing a high signal. The other outputs 12a, 12d are producing a low signal. It has been found that the distance 9 between the high outputs 12b, 12e is twice as great as the actual height 8 of the finger above the panel 3.

Modulating

The processing module 10 modulates and collimates the LEDs 4 and sets a sampling rate. The LEDs 4 are modulated, in the simplest embodiment the LEDs 4 are switched on and off at a predetermined frequency. Other types of modulation are possible, for example modulation with a sine wave. Modulating the LEDs 4 at a high frequency results in a frequency reading (when the finger 7 is sensed) that is significantly greater than any other frequencies produced by changing lights and shadows. The modulation frequency is greater than 500 Hz but no more than 10 kHz.

Sampling

The cameras 6 continuously generate an output, which due to data and time constraints is periodically sampled by the processing module 10. In the preferred embodiment, the sampling rate is at least two times the modulation frequency; this is used to avoid aliasing. The modulation of the LEDs and the sampling frequency does not need to be synchronised.

Filtering

Figure 6:
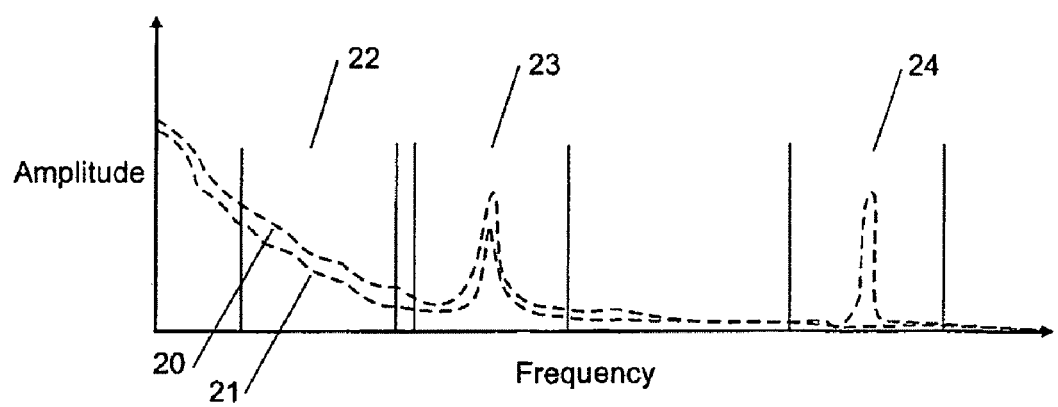
FIG. 6 is a graph representing in the frequency domain the output from the imager in the processing module in the preferred embodiment of the touch screen of the present invention.

The output in the frequency domain from the scanning imager 13 is shown in FIG. 6. In FIG. 6, there are two typical graphs, one showing when there is no object being sensed 21 and one showing when a finger is sensed 20. In both graphs there is a region of movement of shadows 22 at approximately 5 to 20 Hz, and an AC mains frequency region 23 at approximately 50 to 60 Hz.

In the preferred embodiment when there is not object in the field view, no signal is transmitted to the area camera so there are no other peaks in the output. When an object is in the field of view, there is a signal 24 corresponding to the LED modulated frequency, for example 500 Hz. The lower unwanted frequencies 22, 23 can be removed by various forms of filters. Types of filters can include comb, high pass, notch, and band pass filters.

Figure 6A:
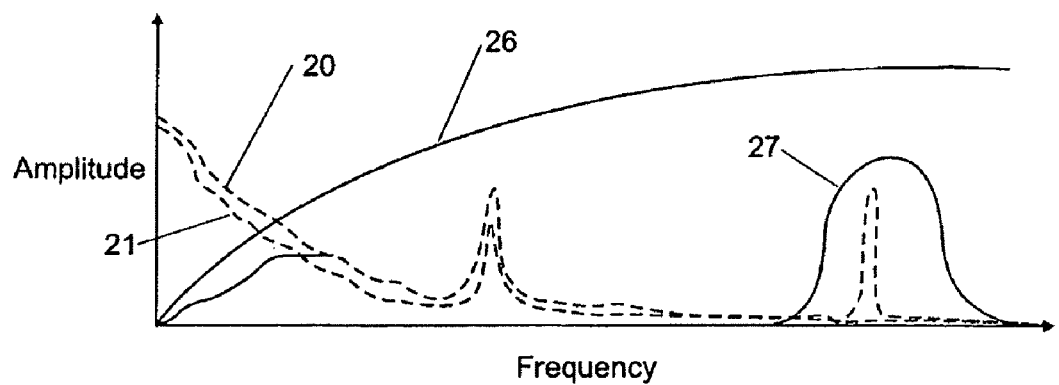
FIG. 6a is a graph representing in the frequency domain the filters responses on the signal from the imager in the preferred embodiment of the touch screen of the present invention.
Figure 6B:
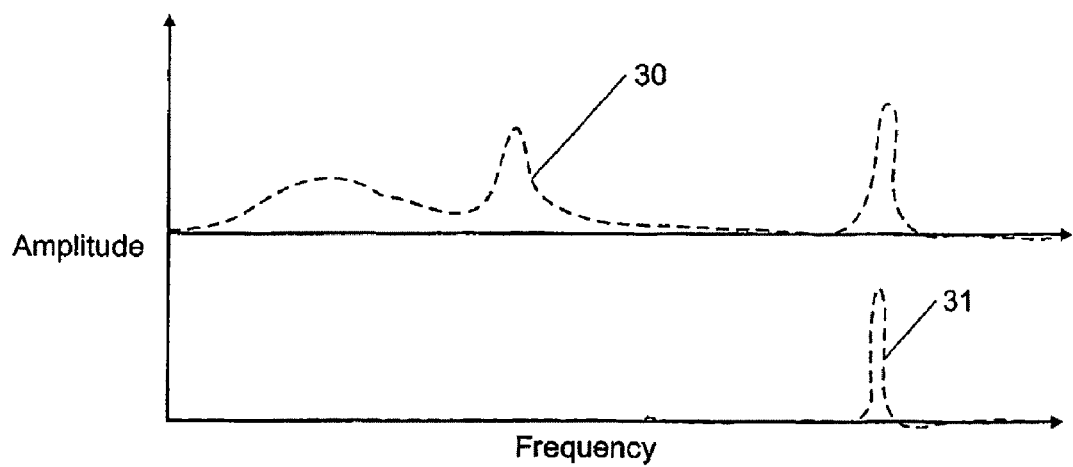
FIG. 6b is a graph representing in the frequency domain the separation of the object from the background after two types of filtering in the preferred embodiment of the touch screen of the present invention.

In FIG. 6a the output from the image scanner is shown with a couple of different filter responses 26, 27 being applied to the signal 20. In a simple implementation a 500 Hz comb filter 26 may be implemented (if using a 500 Hz modulation frequency). This will remove only the lowest frequencies. A more advanced implementation would involve using a band pass 27 or notch filter. In this situation, all the data, except the region where the desired frequency is expected, is removed. In FIG. 6a this is shown as a 500 Hz narrow band filter 27 applied to the signal 20 with a modulation frequency of 500 Hz. These outputs 30, 31 from the filters 26, 27 are further shown in FIG. 6b. The top graph shows the output 30 if a comb filter 26 is used while the bottom graph shows the output 31 when a band filter 27 is used. The band filter 27 removes all unwanted signals while leaving the area of interest.

Once the signal has been filtered and the signal in the area of interest identified, the resulting signal is passed to the comparators to be converted into a digital signal and triangulation is performed to determine the actual position of the object. Triangulation is known in the prior art and disclosed in U.S. Pat. No. 5,534,917 and U.S. Pat. No. 4,782,328, and are herein incorporated by reference.

Calibration

Figure 5:
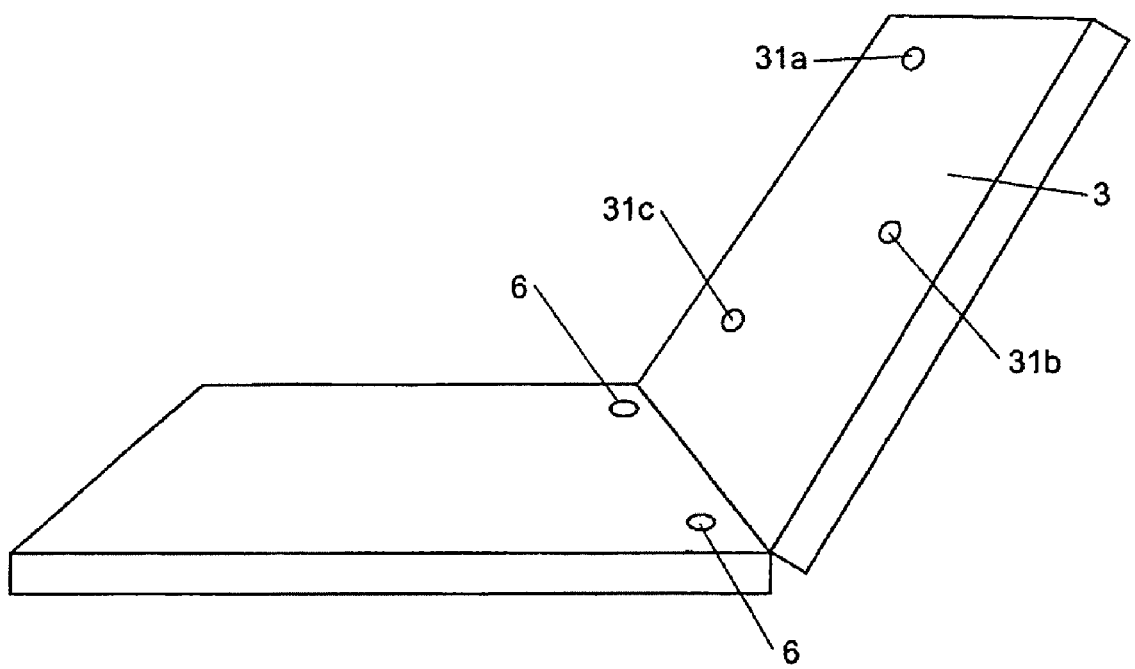
FIG. 5 is an illustration of the calibration in the preferred embodiment of the touch screen of the present invention.

The preferred embodiment of the touch screen of the present invention uses very quick and easy calibration that allows the touch screen to be used in any situation and moved to new locations, for example the touch screen is manufactured as a lap top. Calibration involves touching the panel 3 in three different locations 31a, 31b, 31c, as shown in FIG. 5; this defines the touch plane of the touch panel 3. These three touch points 31a, 31b, 31c provide enough information to the processing module (not shown) to calculate the position and size of the touch plane in relation to the touch panel 3. Each touch point 31a, 31b, 31c uses both mirrored and direct signals, as previously described, to generate the required data. These touch points 31a, 31b, 31c may vary around the panel 3, they need not be the actual locations shown.

Back Illumination Touch Screen

Figure 7D:
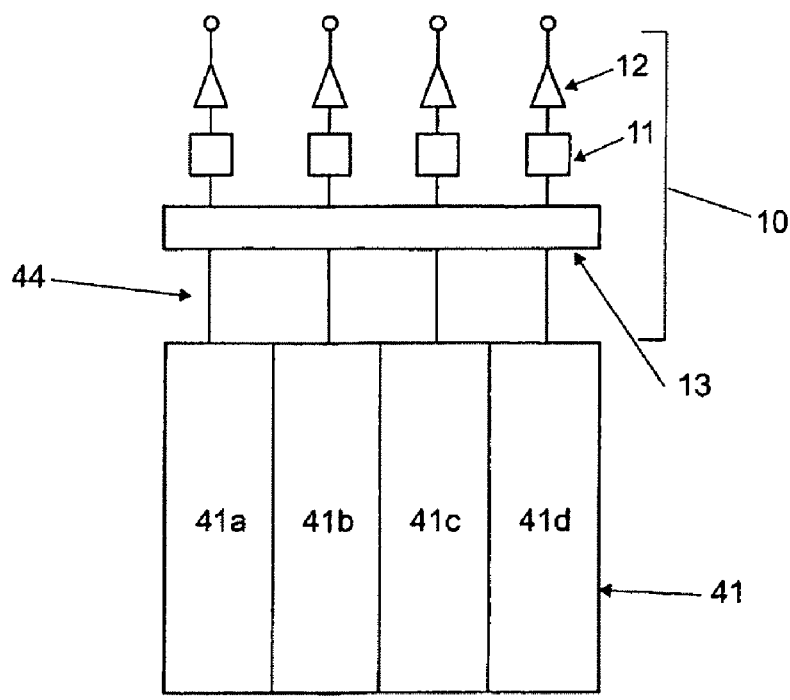
FIG. 7d is a diagrammatic illustration of the pixels seen by a line scan camera and transmitted to the processing module in the alternate embodiment of the present invention.
Figure 7:
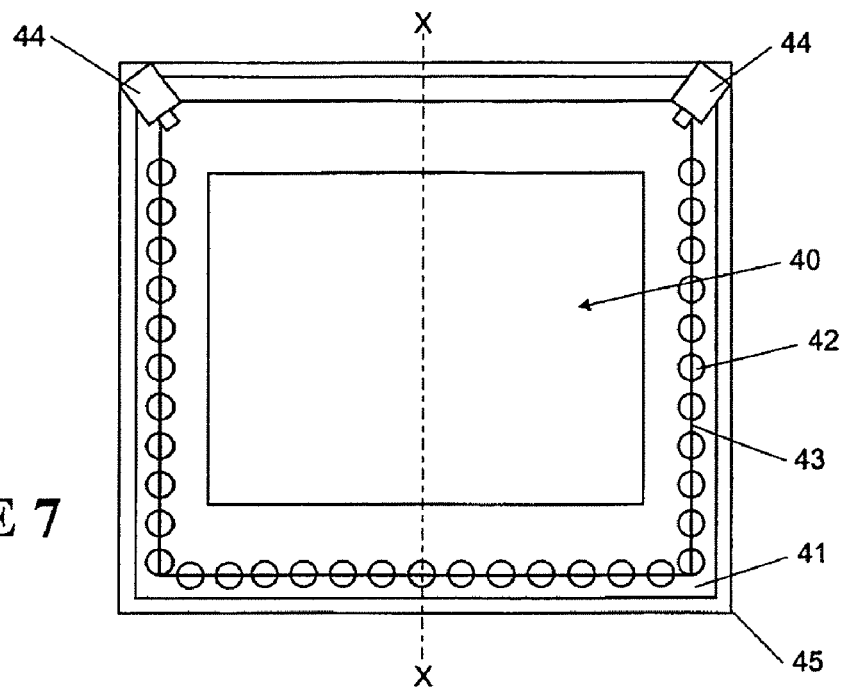
FIG. 7 is an illustration of a front view of the alternate embodiment of the touch screen of the present invention.

FIG. 7 shows the alternate embodiment of the touch screen of the present invention. As in the preferred embodiment, the monitor 40 is behind the touch panel 41 and around the sides and the lower edge of the panel 41 is an array of lights 42. These point outwards towards the user and are redirected across the panel 41 by a diffusing plate 43. The array of lights 42 consists of numerous Light Emitting Diodes (LEDs). The diffusing plates 43 are used redirect and diffuse the light emitted from the LEDs 42 across the panel 41. At least two line-scan cameras 44 are placed in the upper two corners of the panel 3 and are able to image an object. The cameras 44 can be alternately placed at any position around the periphery of the panel 41. Around the periphery of the touch panel 41 is a bezel 45 or enclosure. The bezel 45 acts as a frame that stops the light radiation from being transmitted to the external environment. The bezel 45 reflects the light rays into the cameras 44 so a light signal is always read into the camera 44 when there is no object near the touch panel 41.

Alternately, the array of lights 42 may be replaced with cold cathode tubes. When using a cold cathode tube, a diffusing plate 43 is not necessary as the outer tube of the cathode tube diffuses the light. The cold cathode tube runs along the entire length of one side of the panel 41. This provides a substantially even light intensity across the surface of the panel 41. Cold cathode tubes are not preferably used as they are difficult and expensive to modify to suit the specific length of each side of the panel 41. Using LED's allows greater flexibility in the size and shape of the panel 41.

Figure 7A:
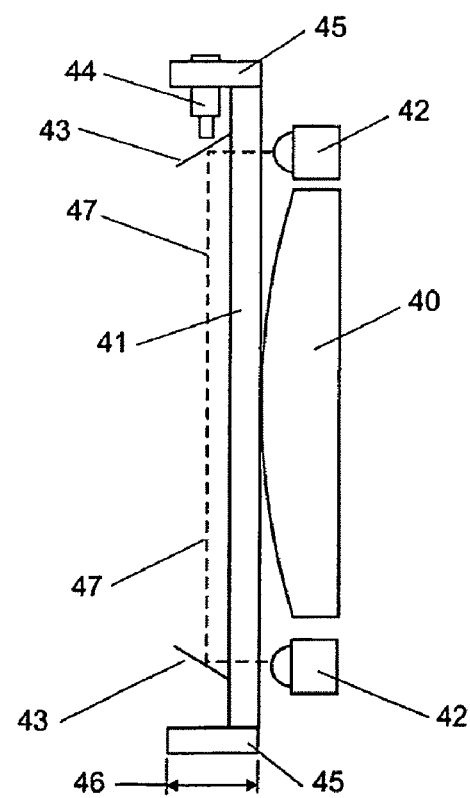
FIG. 7a is an illustration of a cross sectional view through X-X of the alternate embodiment of the touch screen of the present invention.

The diffusing plate 43 is used when the array of lights 42 consists of numerous LED's. The plate 43 is used to diffuse the light emitted from an LED and redirect it across the surface of panel 41. As shown in FIG. 7a, the light 47 from the LEDs 42 begins its path at right angles to the panel 41. Once it hits the diffusing plate 43, it is redirected parallel to the panel 41. The light 47 travels slightly above the surface of the panel 41 so to illuminate the panel 41. The light 47 is collimated and modulated by the processing module (not shown) as previously described.

Referring to FIG. 7a, increasing the width 46 of the bezel 45 can be increased or decreased. Increasing the width 46 of the bezel 45 increases the distance at which an object can be sensed. Similarly, the opposite applies to decreasing the width 10 of the bezel 45

The line scan cameras 44 consists of a CCD element, lens and driver control circuitry. When an image is seen by the cameras 44 a corresponding output signal is generated.

Figure 7B:
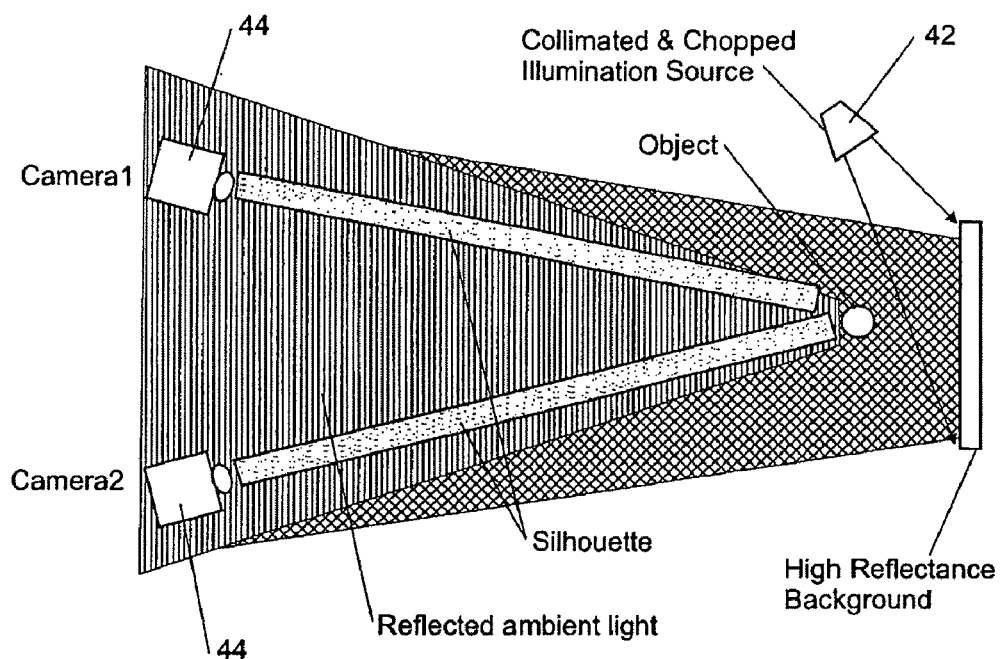
FIG. 7b is an illustration of rear illumination of the alternate embodiment of the touch screen of the present invention.
Figure 7C:
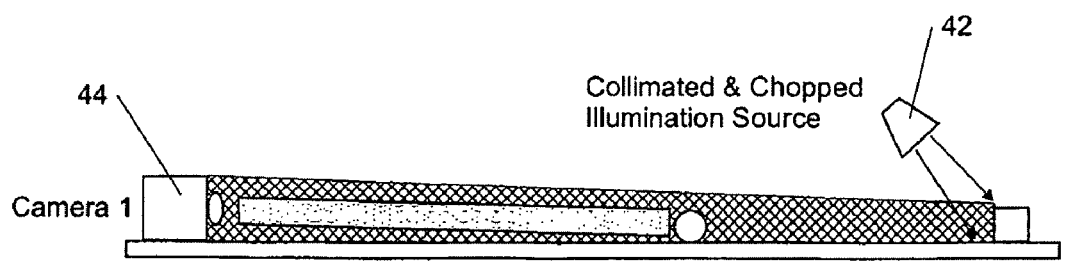
FIG. 7c is an illustration of rear illumination controlling the sense height of the alternate embodiment of the present invention.

Referring to FIGS. 7b and 7c, when the touch screen is not being used, i.e. when there is no user interaction or input, all the light emitted from the array of lights 42 is transmitted to the line-scan cameras 44. When there is user input, i.e. a user selects something on the screen by touching it with their finger; a section of the light being transmitted to the camera 44 is interrupted. Through calculations utilising triangulation algorithms with the outputted data from the camera 44, the location of the activation can be determined.

The line scan cameras 44 can read two light variables, namely direct light transmitted from the LED's 42 and reflected light. The method of sensing and reading direct and mirrored light is similar to what has been previously described, but is simpler as line scan cameras can only read one column from the panel at once; it is not broken up into a matrix as when using an area scan camera. This is shown in FIG. 7d where the panel 41 is broken up into sections 14a-14d (what the line scan camera can see). The rest of the process has been described previously. The pixels shown in this diagram may not form this shape in the panel 41, their shape will be dictated by the position and type of camera 44 used.

In the alternate embodiment, since the bezel surrounds the touch panel, the line scan cameras will be continuously reading the modulated light transmitted from the LEDs. This will result in the modulated frequency being present in the output whenever there is no object to interrupt the light path. When an object interrupts the light path, the modulated frequency in the output will not be present. This indicates that an object is in near to or touching the touch panel. The frequency present in the output signal is twice the height (twice the amplitude) than the frequency in the preferred embodiment. This is due to both signals (direct and mirrored) being present at once.

Figure 8:
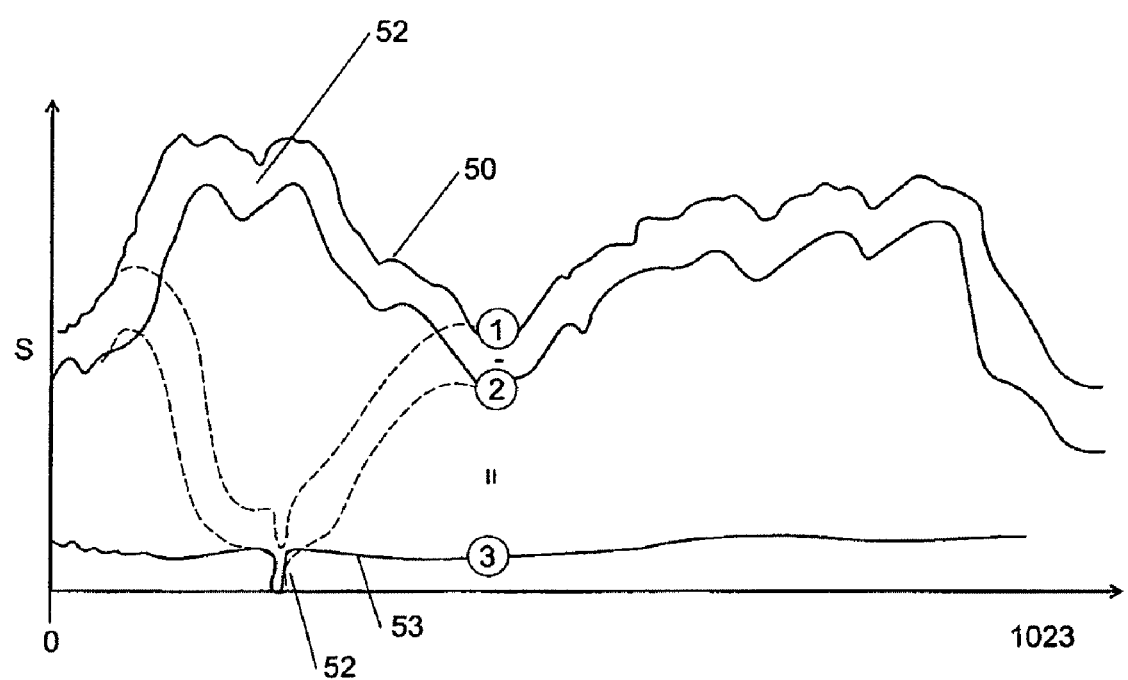
FIG. 8 is a graph representing simple separation of an object from the background in the alternate embodiment of the present invention.

In a further alternate embodiment, shown in FIG. 8, the output from the camera is sampled when the LEDs are modulating on and off. This provides a reading of ambient light plus backlight 50 and a reading of ambient light alone 51. When an object interrupts the light from the LEDs, there is a dip 52 in the output 50. As ambient light varies a lot, it is difficult to see this small dip 52. For this reason, the ambient reading 51 is subtracted from the ambient and backlight reading 50. This results in an output 54 where the dip 52 can be seen and thus simple thresholding can be used to identify the dip 52.

Calibration of this alternate embodiment is performed in the same manner as previously described but the touch points 31*a*, 31*b*, 31*c* (referring to FIG. 5) cannot be in the same line, they must be spread about the surface of the panel 3.

In FIG. 7 the backlight is broken up into a number of individual sections, 42*a* to 42*f*. One section or a subset of sections is activated at any time. Each of these sections is imaged by a subset of the pixels of the image sensors 44. Compared to a system with a single backlight control, the backlight emitters are operated at higher current for shorter periods. As the average power of the emitter is limited, the peak brightness is increased. Increased peak brightness improves the ambient light performance.

The backlight switching may advantageously be arranged such that while one section is illuminated, the ambient light level of another section is being measured by the signal processor. By simultaneously measuring ambient and backlit sections, speed is improved over single backlight systems.

The backlight brightness is adaptively adjusted by controlling LED current or pulse duration, as each section is activated so as to use the minimum average power whilst maintaining a constant signal to noise plus ambient ratio for the pixels that view that section.

Control of the plurality of sections with a minimum number of control lines is achieved in one of several ways.

In a first implementation of a two section backlight two groups of diodes can be wired antiphase and driven with a bridge drive.

In a second implementation with more than two sections, a diagonal bridge drive is used. For example, four wires are able to select 1 of 12 sections, 5 wires can drive 20 sections, and 6 wires can drive 30 sections.

In a third implementation, for a large number of sections, a shift register is physically distributed around the backlight, and only two control lines are required.

X-Y multiplexing arrangements are well known in the art. For example, 8+4 wires are used to control a 4 digit display with 32 LED's. In one embodiment, a 4 wire diagonal multiplexing arrangement can have 12 LEDs. The control lines are driven by tristate outputs such as are commonly found at the pins of microprocessors such as the Microchip PIC family. Each tristate output has two electronic switches which are commonly mosfets. Either or neither of the switches can be turned on. To operate each LED, unique combinations of switches can be enabled. This arrangement can be used with any number of control lines, but is particularly advantageous for the cases of 4,5,6 control lines, where 12,20,30 leds can be controlled whilst the printed circuit board tracking remains simple. Where higher control numbers are used it may be advantageous to use degenerate forms where some of the possible leds are omitted to ease the practical interconnection difficulties.

The diagonal multiplexing system has the following features:

it is advantageous where there are 4 or more control lines it requires tri-state push-pull drivers on each control line rather than using an x-y arrangement of control lines with led's at the crossings, the arrangement is represented by a ring of control lines with a pair of antiphase LED's arranged on each of the diagonals between the control lines. Each LED can be uniquely selected, and certain combinations can also be selected.

uses the minimum possible number of wires where emc filtering is needed on the wires there is a significant saving in components To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention claimed is:

1. A touch display comprising:
a screen for a user to touch and view an image on or through;
a plurality of light sources at one or more edges in front of said screen, said plurality of light sources directing light across the surface of said screen;
at least two cameras located at the periphery of said screen, said at least two cameras located so as not to receive direct light from said plurality of light sources, each of said at least two cameras configured to generate an output by imaging said surface in front of said screen, said output including a mirrored image generated from each of said at least two cameras detecting light reflected from the surface of said screen; and
a processor configured to:
generate processed outputs by processing said outputs to detect a level of reflected light and a level of light from said minor image; and
employ triangulation techniques using said processed outputs to determine the presence of an object proximate to said screen and a location of said object.

2. A touch display as claimed in claim 1 wherein said processed output indicates the relative bearing of a presumed object location relative to said camera and the distance of said object from said screen.

3. A touch display as claimed in claim 1 wherein said processed output indicates the relative bearing of a presumed object location relative to the centre of the lens of said camera.

4. A touch display as claimed in claim 1 wherein said processed output indicates that said object has touched said screen when said object and said presumed object coincide.

5. A touch display as claimed in claim 1 wherein said processor determines the location of said object as a planar screen co-ordinate.

6. A touch display as claimed in claim 1 wherein said at least two cameras are area scan cameras, said camera output including information on area scanned and said processor using said information in determining the location of said object.

7. A touch display as claimed in claim 1: wherein the processor is further configured to:
   cause said plurality of light sources to modulate said light to provide a frequency band within the imageable range of said at least two cameras; and
   exclude image data outside said frequency band.

8. A touch display as claimed in claim 7 wherein the processor is further configured to exclude image data outside said frequency band and to exclude image data outside said frequency includes filtering.

9. A touch display as claimed in claim 8 wherein filtering includes applying a filter selected from the group consisting of:
   a comb filter;
   a high pass filter;
   a notch filter; and
   a band pass filter.

10. A touch display as claimed in claim 1 further including:
    control circuitry configured to control said plurality of light sources; and
    means for taking and processing an image taken in a non lighted ambient light state and in a lighted state;
    wherein said processor is configured to subtract the ambient state from the lighted state before detecting the level of light.

11. A touch display comprising:
    a screen for a user to touch and view an image on or through;
    a plurality of light sources located at one or more edges behind said screen, said plurality of light sources directing light across the surface of said screen;
    at least two cameras located at the periphery of said screen, said at least two cameras located so as not to receive direct light from said plurality of light sources, each of said at least two cameras configured to generate an output by imaging said surface in front of said screen, said output including a mirror image generated from each of said at least two cameras detecting light reflected from the surface of said screen; and
    a processor configured to:
    generate processed outputs by processing said outputs to detect a level of reflected light and a level of light from said minor image; and
    employ triangulation techniques using said processed outputs to determine the presence of an object proximate to said screen and a location of said object.

12. A touch display as claimed in claim 11 wherein said processed output indicates the relative bearing of a presumed object location relative to said camera and the distance of said object from said screen.

13. A touch display as claimed in claim 11 wherein said processed output indicates the relative bearing of a presumed object location relative to the centre of the lens of said camera.

14. A touch display as claimed in claim 11 wherein said processed output indicates that said object has touched said screen when said object and said presumed object coincide.

15. A touch display as claimed in claim 11 wherein said processor determines the location of said object as a planar screen co-ordinate.

16. A touch display as claimed in claim 11 wherein said at least two cameras are area scan cameras, said camera output including information on area scanned and said processor using said information in determining the location of said object.

17. A touch display as claimed in claim 11 wherein said plurality of light sources are behind said screen arranged to project light through said screen and said display includes at each edge having a light source, light deflectors in front of said screen, directing light emitted from said plurality of light sources across the surface of said screen.

18. A touch display as claimed in claim 11, wherein the processor is further configured to:
    cause said plurality of light sources to modulate said light to provide a frequency band within the imageable range of said at least two cameras; and
    exclude image data outside said frequency band.

19. A touch display as claimed in claim 18 wherein the processor is further configured to exclude image data outside said frequency band and to exclude image data outside said frequency includes filtering.

20. A touch display as claimed in claim 19 wherein filtering includes applying a filter selected from the group consisting of: a comb filter; a high pass filter; a notch filter; and a band pass filter.

21. A touch display as claimed in claim 11 further including:
    control circuitry configured to control said plurality of light sources; and
    means for taking and processing an image taken in a non lighted ambient light state and in a lighted state;
    wherein the processor is further configured to subtract the ambient state from the lighted state before detecting the level of light.

22. A method of receiving user inputs in reference to an image including the steps of:
    providing a screen for a user to touch and view an image on or through;
    providing a plurality of light sources at one or more edges behind said screen, said plurality of light sources directing light across the surface of said screen;
    providing at least two cameras located at the periphery of said screen, said at least two cameras located so as not to receive direct light from said plurality of light sources, each of said at least two cameras configured to generate an output by imaging said surface in front of said screen, said output including a mirror image generated from each of said at least two cameras detecting light reflected from the surface of said screen;
    processing said outputs to detect a level of reflected light and a level of light from said mirror image; and
    processing the processed outputs of said at least two cameras by employing triangulation techniques using said processed outputs to determine the presence of an object proximate to said screen a location of said object.

23. A method of receiving user inputs in reference to an image as claimed in claim 22 wherein said processed output indicates the relative bearing of a presumed object location relative to said camera and the distance of said object from said screen.

24. A method of receiving user inputs in reference to an image as claimed in claim 22 wherein said processed output indicates the relative bearing of a presumed object location relative to the centre of the lens of said camera.

25. A method of receiving user inputs in reference to an image as claimed in claim 2 wherein said processed output indicates that said object has touched said screen when said object and said presumed object coincide.

26. A method of receiving user inputs in reference to an image as claimed in claim 22 wherein said processor determines location of said object as a planar screen co-ordinate.

27. A method of receiving user inputs in reference to an image as claimed in claim 22 wherein said at least two cameras are area scan cameras, said camera output including information on area scanned and said processor using said information in determining the location of said object.

28. A touch display as claimed in claim 22 wherein said plurality of light sources are behind said screen arranged to project light through said screen and said display includes at each edge having a light source, light deflectors in front of said screen, directing light emitted from said plurality of light sources across the surface of said screen.

29. A method of receiving user inputs in reference to an image as claimed in claim 22 further including:
modulating said light from said plurality of light sources to provide a frequency band within the imageable range of said at least two cameras; and
excluding image data outside said frequency band.

30. A method of receiving user inputs in reference to an image as claimed in claim 29 wherein said processing said outputs includes excluding image data outside said frequency band and excluding image data outside said frequency includes filtering.

31. A method of receiving user inputs in reference to an image as claimed in claim 30 wherein filtering includes applying a filter selected from the group consisting of: a comb filter; a high pass filter; a notch filter; and a band pass filter.

32. A method of receiving user inputs in reference to an image as claimed in claim 22 further including:
controlling said plurality of light sources; and
taking and processing an image taken in a non lighted ambient light state and in a lighted state;
wherein processing said outputs comprises subtracting the ambient state from the lighted state before detecting the level of light.

* * * * *